United States Patent [19]

Locacius

[11] Patent Number: 4,630,835
[45] Date of Patent: Dec. 23, 1986

[54] HEAD GASKET AND SEALING ASSEMBLY FOR A V-ENGINE AT THE INTERSECTION OF A BLOCK, A HEAD AND AN INTAKE MANIFOLD COVER

[75] Inventor: Robert F. Locacius, Lake Zurich, Ill.

[73] Assignee: Felt Products Mfg. Co., Skokie, Ill.

[21] Appl. No.: 839,103

[22] Filed: Mar. 13, 1986

[51] Int. Cl.⁴ .............................................. F16J 15/12
[52] U.S. Cl. ............................... 277/235 B; 277/166; 277/184
[58] Field of Search ............... 277/166, 184, 227, 229, 277/234, 235 R, 235 B

[56] References Cited

U.S. PATENT DOCUMENTS

| | | | |
|---|---|---|---|
| 1,985,473 | 12/1934 | Victor | 277/235 B |
| 3,936,059 | 2/1976 | Jordon | 277/235 B X |
| 3,957,279 | 5/1976 | Belter | 277/235 B |
| 4,213,620 | 7/1980 | Kennedy et al. | 277/235 B |

Primary Examiner—Robert S. Ward
Attorney, Agent, or Firm—Dressler, Goldsmith, Shore, Sutker & Milnamow, Ltd.

[57] ABSTRACT

A gasket such as a head gasket having a sealing bead on the main body portion. The sealing bead terminates just short of the gasket periphery. An embossment at the periphery extends inwardly to the sealing bead and merges therewith. The embossment and bead may merge on the extension portion of a head gasket to seal against the passage of oil from the associated engine crankcase.

8 Claims, 5 Drawing Figures

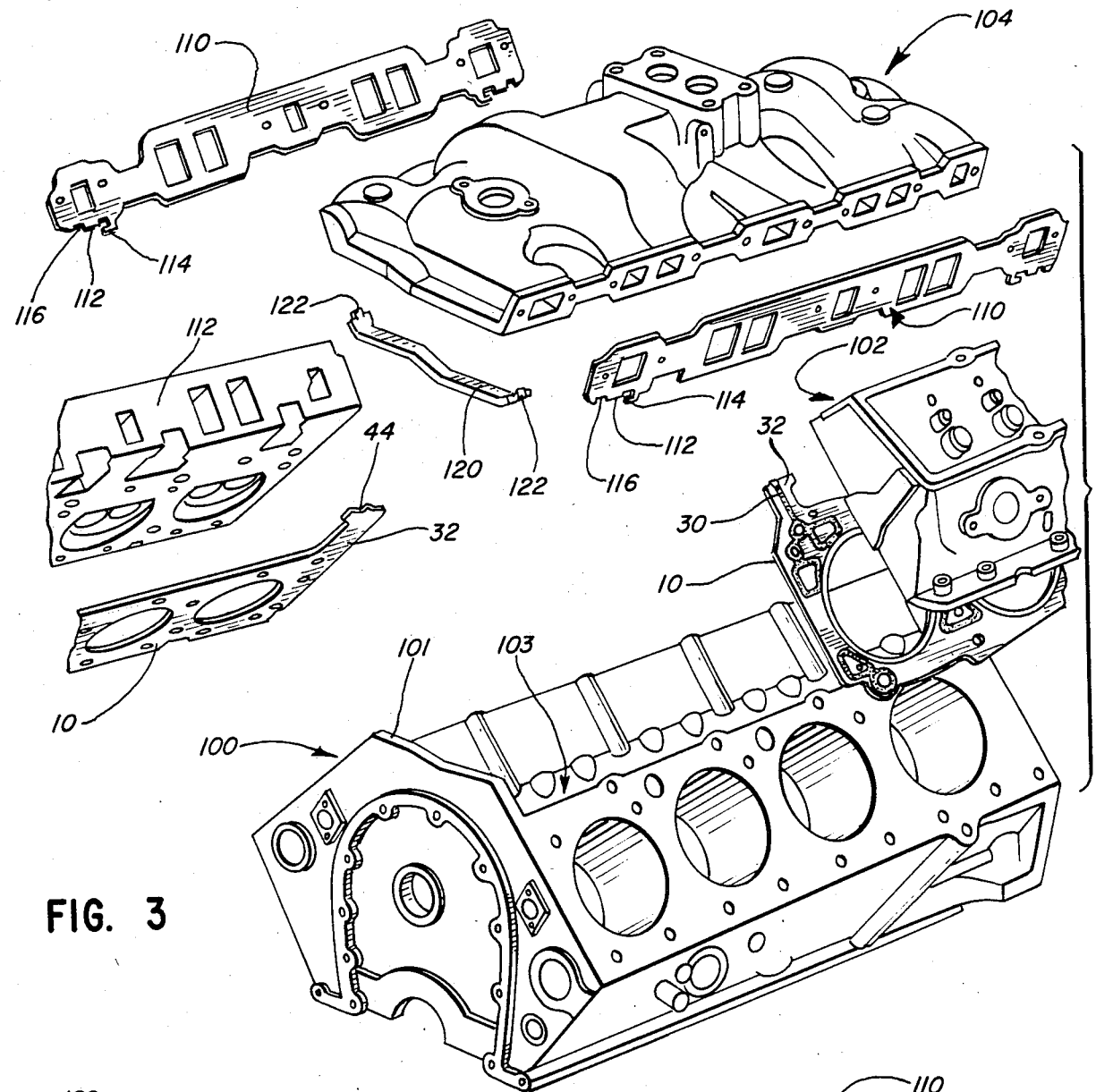
FIG. 3
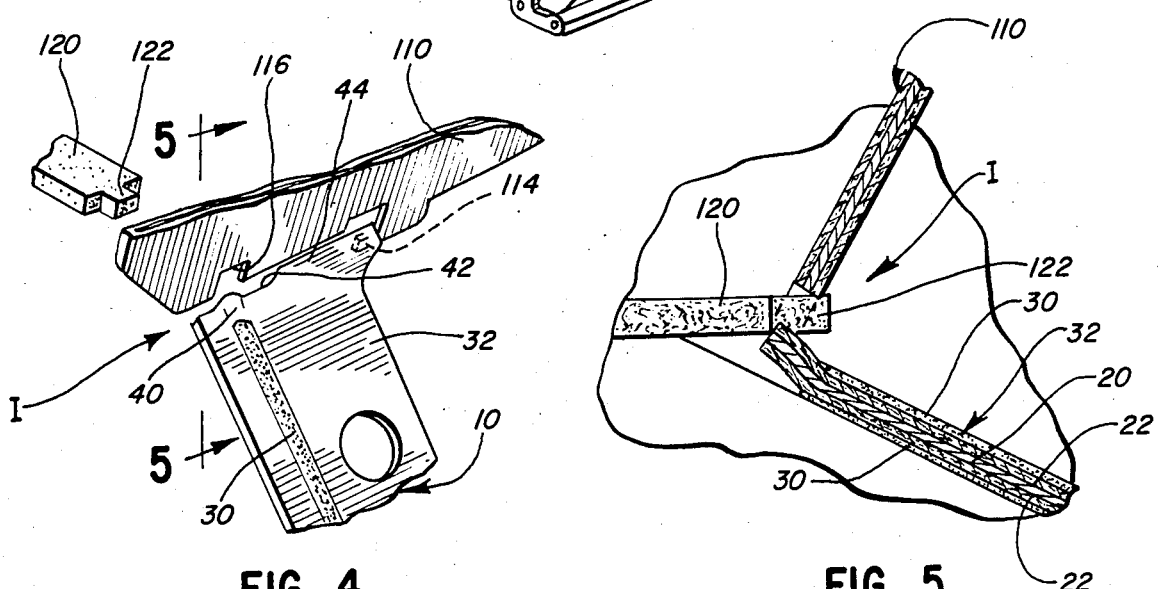
FIG. 4
FIG. 5

4,630,835

HEAD GASKET AND SEALING ASSEMBLY FOR A V-ENGINE AT THE INTERSECTION OF A BLOCK, A HEAD AND AN INTAKE MANIFOLD COVER

BACKGROUND OF THE INVENTION

This invention relates to improvements in sealing gaskets, especially for internal combustion engines, and particularly in the sealing of the crankcase of an internal combustion engine to prevent the escape of oil therefrom.

When automotive engines such as V-6 and V-8 automobile engines are opened for servicing, they are thereafter reassembled with an appropriate set of seals and gaskets, typically including head gaskets, intake manifold gaskets, and intake manifold end seals, all of which intersect at each end of the associated block. The points of intersection which are relatively small in area chronically present a sealing problem. The usual solution has been to apply a liberal mass of a tube-applied sealing compound, such as an RTV silicone to stop-up the area, thereby to minimize the possibility of splashing out of oil from the crankcase.

Sealing compounds do not provide a guaranteed seal. Further, if they are omitted, then the possibility of a leak is enhanced resulting in the too-rapid loss of engine lubricant, as well as in the splashing of oil over adjacent parts under the hood, in the dripping of oil on garage floors, and the like.

One solution to the problem of sealing the points of intersection which has reduced the problem has been to apply a sealing bead, as by imprinting a bead of silicone on the portion of the head gasket which meets the intake manifold gasket and intake manifold end seal at the intersection. The bead tends to engage the adjacent parts, thereby to provide a dam or barrier with the end seal to prevent oil from escaping from the crankcase at that zone. However, the sealing bead sometimes fails to accomplish its purpose, in part, apparently, due to the fact that currently available printing processes for applying silicone beads to gaskets do not permit the imprinting of beads to the very perimeter of the gasket. The bead therefore terminates about ⅛" or so from the edge of the gasket. Thus, in some cases, the intersection and engagement between the intersection of the head gasket portion and adjacent end seal fails to provide an effective seal thereat and in the related zone of the intake manifold gasket, thereby permitting oil to escape through the open path between the adjacent sealing elements.

An improved method and means for sealing the point of intersection between the head gasket, intake manifold gasket and intake manifold end seal is therefore highly to be desired.

SUMMARY OF THE INVENTION

In accordance with the present invention, an improved sealing gasket such as a head gasket for an internal combustion engine is provided. The head gasket comprises an elongated main body portion having a pair of spaced ends and a pair of spaced sides, a plurality of openings defined by the main body portion including at least one combustion opening and a plurality of oil and water passageways, and a main body portion extension for sealing against the passage of oil thereover. An elongated sealing bead is disposed on the extension and terminates short of the peripheral edge of the extension. An embossment is provided in the extension. The embossment extends inwardly from the peripheral edge of the extension in line with the sealing bead and merging into the sealing bead.

Preferably the head gasket includes two main body portion extensions, one at each end of the gasket and projecting from one side thereof and adapted to engage and seal with an intake manifold gasket and an end seal, each extension having an embossment. Desireably, the embossment is wider than the sealing bead.

The present invention, in a preferred form, comprises a sealing assembly for the crankcase of a V-engine having a block defining a crankcase, a pair of heads and an intake manifold requiring sealing of the end intersection of the block, a head and the intake manifold. The sealing assembly includes an intake manifold gasket, an end seal and an extension of a head gasket. The head gasket includes a main body portion, a plurality of openings defined by the main body portion including at least one combustion opening and a plurality of oil and water passageways, and the main body provides a main body portion providing the extension for sealing against the passage of oil from said crankcase thereover.

An elongated sealing bead is disposed on the extension and terminates short of the peripheral edge of the extension. An embossment is provided in the extension, the embossment extending inwardly from the peripheral edge of the extension in line with the sealing bead and merging into the sealing bead. The end seal bears against the embossment to provide a seal thereat.

The sealing assembly is desirably configured such that the intake manifold gasket defines a recess and the end seal defines a tongue sealingly disposed against the sides of the recess, and the embossment is positioned against the tongue to bear thereagainst to provide a seal thereat, and the sealing assembly thereby provides a seal continuously from that point inwardly thereof and along the embossment and aligned sealing bead.

Further objects, features and advantages of the present invention will become apparent from the following description and drawings.

BRIEF DESCRIPTION OF THE DRAWINGS

FIG. 3 is an exploded fragmentary view of an internal combustion engine employing the head gasket of FIG. 1;

FIG. 4 is an exploded perspective view of the intersection of the head gasket of FIG. 1 with an intake manifold gasket and end seal; and FIG. 5 is an enlarged assembled sectional view of the elements of FIG. 4 taken generally along line 5—5 of FIG. 4.

DESCRIPTION OF THE PREFERRED EMBODIMENT

Figure 1:
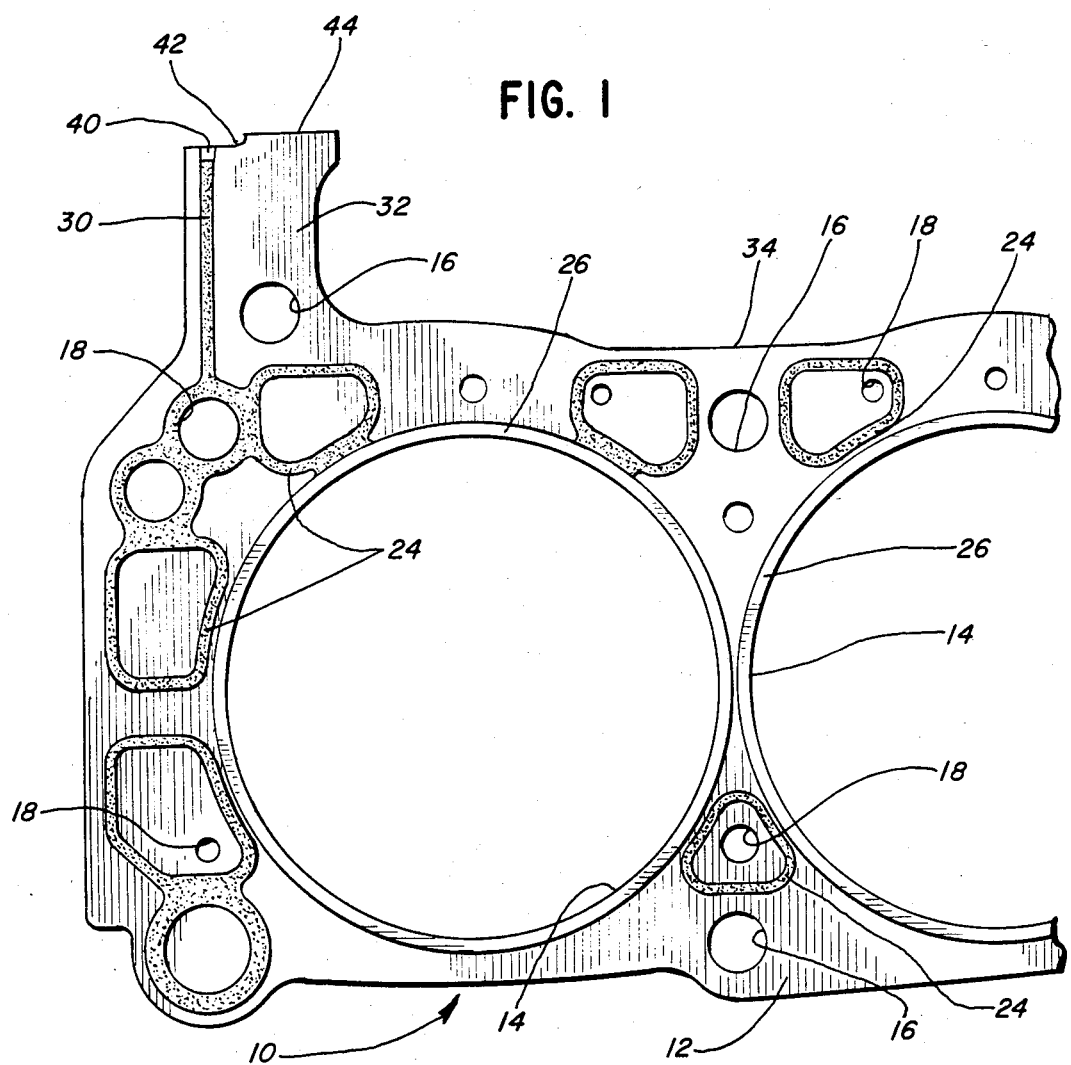
FIG. 1 is a fragmentary plan view of a head gasket of the present invention.
Figure 2:
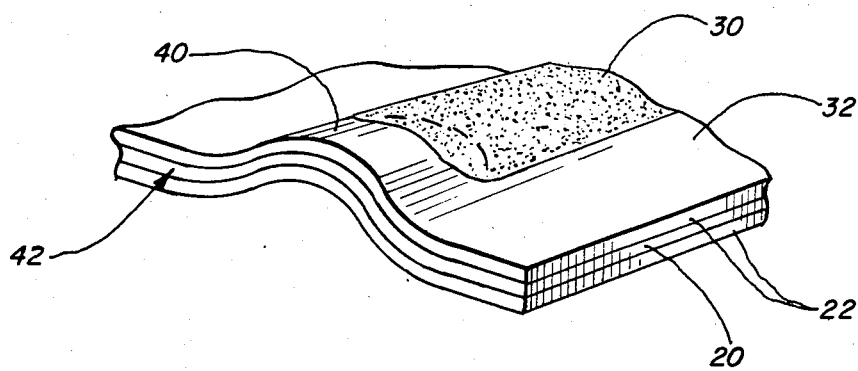
FIG. 2 is an enlarged perspective view of a portion of the head gasket of FIG. 1.

The improved head gasket of the present invention may take a variety of forms. A presently preferred form is shown in the drawings.

Referring now to the drawings, FIG. 1 illustrates a head gasket 10 employing the improvements of the present invention. Gasket 10 comprises a main body 12 which is die cut or blanked out, as by a stamping machine, a punch press, or the like, and provides a plurality of openings, including at least one combustion opening 14, bolt holes 16, and a plurality of oil and water passageways 18 through which lubricant and coolant, respectively, flow through an associated block and head.

The main body 12 comprises a generally flat metallic core 20. A sheet or facing 22 of composite compressible gasket facing material is applied to each surface of the core 20, as by an adhesive in a known manner. The facings may comprise a composite of fibers and a binder, the most commonly used fibers being asbestos and glass fibers, and the most commonly used binders comprising nitrile neoprene and polyacrylic elastomers. The facings are prepared to be resistant to degradation by oils and coolants, to retain torque, to minimize extrusion, and to exhibit heat resistance.

After assembly in a known manner, it is these composite core-facing assemblies that are cut out to provide the main body 12. The main body is elongated and has a pair of spaced ends and a pair of spaced sides. Typically, the main gasket body 12 may be about 0.045 inch thick, with each of the core 20 and the facings being about 0.015 inch thick. These dimensions may vary with the application. To enhance the sealing effect of the gasket and to improve its heat resistance characteristics, an armor or fire ring 76 is secured in each of the combustion openings. Fire rings 26 may be of a conventional type and may be applied in the combustion openings 14 in any one of the many ways known to the art.

As seen in FIG. 1, a sealing bead is applied to each outer surface of the main body 12. A sealing bead 24 is selectively applied where its sealing effect is desired, as around a number of the openings.

The sealing beads 24 are preferably applied by a silk-screening process, typically as described in U.S. Pat. No. 3,477,867, the disclosure of which is here incorporated by reference, with a bead height of about 0.006 inch and a bead width of about 0.100 inch. The sealant may be a two-component, heat curable liquid silicone.

Additionally, a sealing bead 30 is similarly applied to the main body sealing extensions 32 which project outwardly of one of the sides of the gasket, one at each end of the gasket 10. Extensions 32, together with the merging peripheral portion 34 of the main body 12, form a portion of a border for the engine block surrounding the crankcase. It is therefore apparent that the extensions 32 serve to seal the crankcase from the surrounding environment in which an engine is disposed, and must provide an effective seal to prevent splashing of the oil outwardly of the engine.

To this end, the sealing bead 30 is intended to prevent oil from passing thereacross outwardly of the engine. It will be seen that the very end of the extension is not provided with the bead 30. This is because available silk screening processes do not permit printing to the very edge of gasket bodies. As such, when such gaskets were used previously they too frequently failed to seal against the escape of oil.

In accordance with the present invention, an embossment 40 is provided in and at the very edge of the extension 32 in line with bead 30. This innovation has converted typical gaskets for use in such environments from ones which either leak or which require the application of tube sealants to ones which effectively seal without the need for tube sealants or the like. Embossment 40 extends from the peripheral edge 42 of the extension 32 inwardly in line with the bead 30 into the zone of the bead 30 and merges thereinto. Its height may be approximately 0.010 inch at its highest point (when the bead height is about 0.006 inch), is slightly wider than the bead, and merges into the bead. The length of the embossment is about 0.090 to 0.125 inch, slightly longer than the distance between the bead 30 and the edge 42. The width of the embossment is about 0.125. The height of the embossment is greatest at the edge 42 and gradually tapers into, the zone of the bead, merging into and with the bead, as illustrated by FIG. 5.

Referring now to FIGS. 3-5, the improved gasket 10 of the present invention may be used with a V-8 engine comprising a block 100, heads 102 and a cover 104. These are sealed to each other by a pair of head gaskets 10, a pair of intake manifold gaskets 110, and a pair of intake manifold end seals 120, only one of the seals 120 being shown. The intake manifold end seals are intended to seal at the ends of the block 100, as against block surfaces 101. The overall sealing, inter alia, is intended to prevent oil from the crankcase 103 to escape therefrom.

The intake manifold gaskets 110 may comprise a central metal core and facing sheets like those of the main gasket body 12, and are punched or cut with suitably proportioned and positioned apertures. The ends are configured to mate with and match complementary portions of head gasket 10 and the end seals 120 at intersections I. End seals 120 may be flat and formed of a known cork-rubber composition which comprises ground cork compounded with an elastomeric binder. Seals 120 are resilient and are also configured to mate with and match portions of the head gasket 10 and gaskets 110 at intersection I.

The intersection of the sealing elements is best seen in FIGS. 4 and 5. As there shown, the edge 42 of the extension defines a projecting portion 44. Portion 44 is adapted to be seated in a locating notch 112 in the intake manifold gasket which has a projection 114 to help locate portion 44. At the other end of the notch 112, gasket 110 defines a further generally square notch or recess 116 which is proportioned to snugly receive a tongue 122 projecting from the end of the end seal 120. When tongue 122 is seated in recess 112, it provides a seal and barrier against the passage of oil past the surfaces defining the recess. Further, when the elements are assembled as shown in FIG. 5, tongue 122 positively bears against the embossment 40 providing a positive seal along the upper edge of the embossment and the confronting lower edge of the tongue 122, positively preventing the passage of oil thereby and through the recess 116.

In prior practice, tube sealants were disposed in the zone of the intersection I of the end seal 120, recess 116 and extension 32. However, sometimes the seal provided by the sealant failed, and sometimes no seal was formed in the first instance. In accordance with the present invention, a positive, long lasting seal is provided at the intersection I.

A specific environment and particular problem solved in accordance with the present invention has been described. However, it will be apparent that other environments in which sealing beads are used but which also require sealing to a peripheral edge will benefit as well from the present invention. Thus, for example, gaskets sealing the junction of a front cover gasket and oil pan gasket are also contemplated for use in accordance with the present invention. Similarly an embossment extension of a sealing bead on an exhaust manifold gasket could be used as well.

It will be apparent to those skilled in the art that variations of the disclosed embodiment may be made without departing from the spirit and scope of the present invention. Accordingly, I do not intend the invention to be limited to the embodiments shown or described, except as may be made necessary by the appended claims.

What is claimed is:

1. A sealing gasket comprising
   an elongated main body portion having a pair of spaced ends and a pair of spaced sides,
   an opening defined by said main body portion,
   an elongated sealing bead disposed on said main body portion and terminating just short of a peripheral edge of said main body portion, and
   an embossment on said main body portion, said embossment extending inwardly from said peripheral edge in line with said sealing bead and merging into said sealing bead.

2. A sealing gasket in accordance with claim 1 and wherein each said embossment is wider than said sealing bead.

3. A head gasket for an internal combustion engine comprising
   an elongated main body portion having a pair of spaced ends and a pair of spaced sides,
   a plurality of openings defined by said main body portion including at least one combustion opening and a plurality of oil and water passageways,
   a main body portion extension for sealing against the passage of oil thereover,
   an elongated sealing bead disposed on the extension and terminating just short of a peripheral edge of said extension, and
   an embossment in said extension, said embossment extending inwardly from said peripheral edge of said extension in line with said sealing bead and merging into said sealing bead.

4. A head gasket in accordance with claim 3 and wherein said head gasket includes two main body portion extensions, one at each end of said gasket and projecting from one side thereof and adapted to engage and seal with an intake manifold gasket and an end seal, each said extension having a said embossment and sealing bead.

5. A head gasket in accordance with claim 4 and wherein each said embossment is wider than said sealing beads.

6. A gasket for a pair of components of an internal combustion engine, said gasket comprising a main body portion and a plurality of openings defined by said main body portion,
   an elongated sealing bead disposed on said main body portion and terminating short of the peripheral edge thereof, and
   an embossment in said main body portion, said embossment extending inwardly from said peripheral edge in line with said sealing bead and merging into said sealing bead, and
   and one of said components bearing against said embossment to provide a seal thereat.

7. A sealing assembly for the crankcase of a V-engine comprising a block defining a crankcase, a pair of heads and an intake manifold requiring sealing at the end intersection of the block, a head and the intake manifold, and said sealing assembly including an intake manifold gasket, an end seal and a head gasket having an extension thereon, said head gasket comprising a main body portion, a plurality of openings defined by said main body portion including at least one combustion opening and a plurality of oil and water passageways, and said main body portion providing said extension for sealing against the passage of oil from said crankcase,
   an elongated sealing bead disposed on said extension and terminating short of the peripheral edge of said extension, and
   an embossment in said extension, said embossment extending inwardly from said peripheral edge of said extension in line with said sealing bead and merging into said sealing bead,
   and said end seal bearing against said embossment to provide a seal thereat.

8. The sealing assembly of claim 7, and wherein said intake manifold gasket defines a recess and said end seal defines a tongue sealingly disposed against said recess, and said embossment is positioned against said tongue to bear thereagainst to provide a seal thereat, and said sealing assembly thereby provides a seal continuously from that point inwardly thereof and along the embossment and aligned sealing bead.

* * * * *